(No Model.)
W. J. MYERS.
DOOR MAT.
No. 410,556. Patented Sept. 3, 1889.
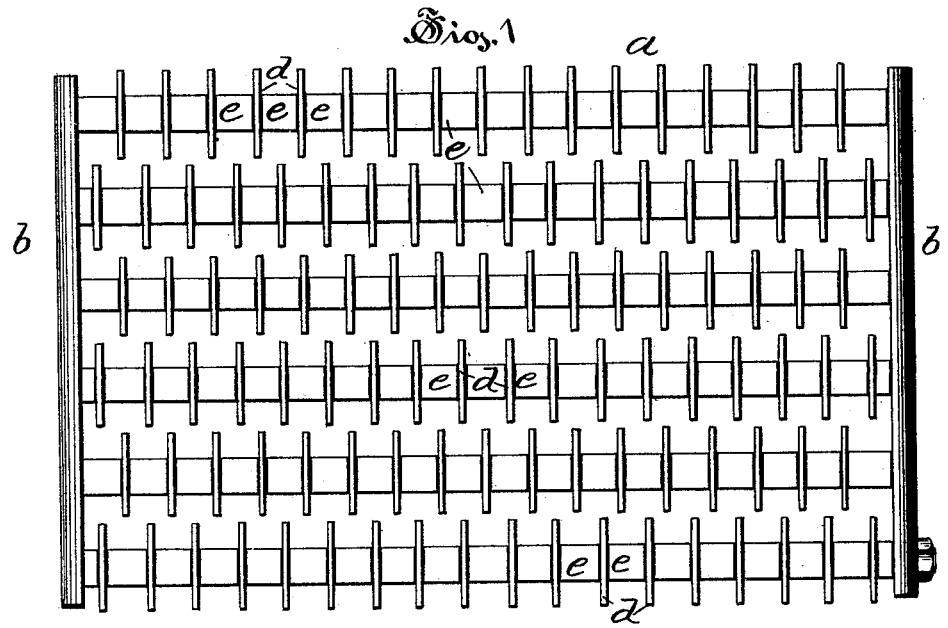
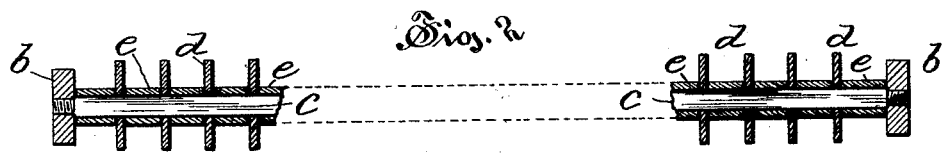
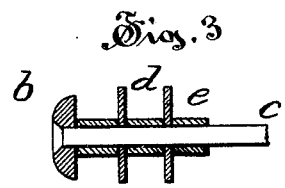
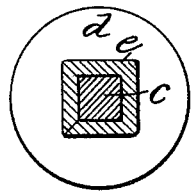
Witnesses:
Harry R. Williams.
A. B. Jenkins
Inventor,
William J. Myers,
By Simonds & Burdett,
atty.

UNITED STATES PATENT OFFICE.

WILLIAM J. MYERS, OF HARTFORD, CONNECTICUT, ASSIGNOR TO GEORGE P. BISSELL & CO., OF SAME PLACE.

DOOR-MAT.

SPECIFICATION forming part of Letters Patent No. 410,556, dated September 3, 1889.

Application filed April 27, 1889. Serial No. 308,784. (No model.)

*To all whom it may concern:*

Be it known that I, WILLIAM J. MYERS, of Hartford, in the county of Hartford and State of Connecticut, have invented certain new and useful Improvements in Door-Mats, of which the following is a full, clear, and exact description, whereby any one skilled in the art can make and use the same.

The object of my invention is to provide a mat that shall be simple and rigid in construction, that shall be effective as a scraper, and shall be so constructed that the parts can be readily put together or taken apart for use or shipment.

My invention consists in the combination of a frame, and a series of rods extending across said frame and bearing a series of projecting scrapers arranged at intervals along each rod; and it further consists in details of the several parts of the mat and their combination, as more particularly hereinafter described, and pointed out in the claims.

Referring to the drawings, Figure 1 is a plan view of a mat embodying my invention. Fig. 2 is a detail view, in section, through the frame and a short length of one of the rods, showing construction. Fig. 3 is a detail view, in section, of the edge of the mat, showing the riveted end of one of the rods. Fig. 4 is a detail view, in crosswise-section, on enlarged scale, through a rod.

In the accompanying drawings, the letter $a$ denotes the mat, and $b$ the frame, that may extend completely around the mat, or consist of the end pieces, as shown in the drawings.

Between the opposite parts of the frame a series of cross-rods $c$ extend, and they are arranged at any desired distance apart along the frame. These rods are secured to the frame by having the end inserted in a hole in the frame, and that end then headed over or riveted, as shown in Fig. 3 of the drawings; or the opposite ends of the rods are preferably provided with right-hand and left-hand screw-threads that take into the corresponding sockets in the opposite parts of the frame, as shown in Fig. 2 of the drawings. Each of the rods bears a number of disk-like scrapers $d$, that are strung along the rod at intervals, so as to project at about right angles from the rod, the scrapers being held apart by means of the collars $e$, that are placed between each two of the scrapers and form shoulders to prevent the collars from sliding along the rods. The rod $c$ is preferably of angular cross-section, and the scrapers preferably have a corresponding hole, so that it is held against rotation on the rod. These scrapers on adjacent rods are preferably arranged so that the scrapers on one rod project toward the interval between the scrapers on the rod at each side—that is, the scrapers and spaces between them are arranged in alternation on successive rods across the mat.

When the mat is made with the cross-rods having threaded ends, or when the ends are arranged to project completely through the frame, so as to receive a nut or like means of fastening the outside rods, the mat is made up as to the frame and the rest of the parts, and is packed in a compact shape, and can be afterward readily assembled at the place to which it may be shipped and when desired for use.

I do not limit myself to the particular construction or shape of the frame as to cross-section.

The outside rod, with its projecting scrapers, affords a means for thoroughly cleaning the edge of the sole of a boot or shoe, and the several rods are arranged at such distance apart that the adjacent edges of the disks form a low place in the mat, that also is of use in scraping the edge of a sole. When the scraper-disks have a round hole, they may be driven onto the angular bar tight enough to hold them against rotation when desired.

I claim as my invention—

1. In combination, in a mat, the frame, the crosswise-extending rods, and the disk-shaped scrapers arranged at intervals along the rod and projecting therefrom, all substantially as described.

2. In a mat and scraper, in combination with the frame, the rods extending crosswise of the frame and detachably secured to the said frame at opposite ends, and the disk-shaped scrapers secured at intervals along each rod and held rigidly thereon, all substantially as described.

3. In a mat and scraper, in combination with the frame having threaded sockets, the crosswise rods having the opposite ends provided with a right-hand thread and a left-hand thread, respectively, said rods being angular in cross-section, the scraper-disks rigidly secured on the rods, and the collars or equivalent device for holding the disks against movement lengthwise on the rod, all substantially as described.

WILLIAM J. MYERS.

Witnesses:
H. E. BACHARACH,
W. B. JENKINS.